April 18, 1967  J. L. BURINSKY ETAL  3,314,596
FORAGE BLOWER
Filed Oct. 19, 1965  2 Sheets-Sheet 1
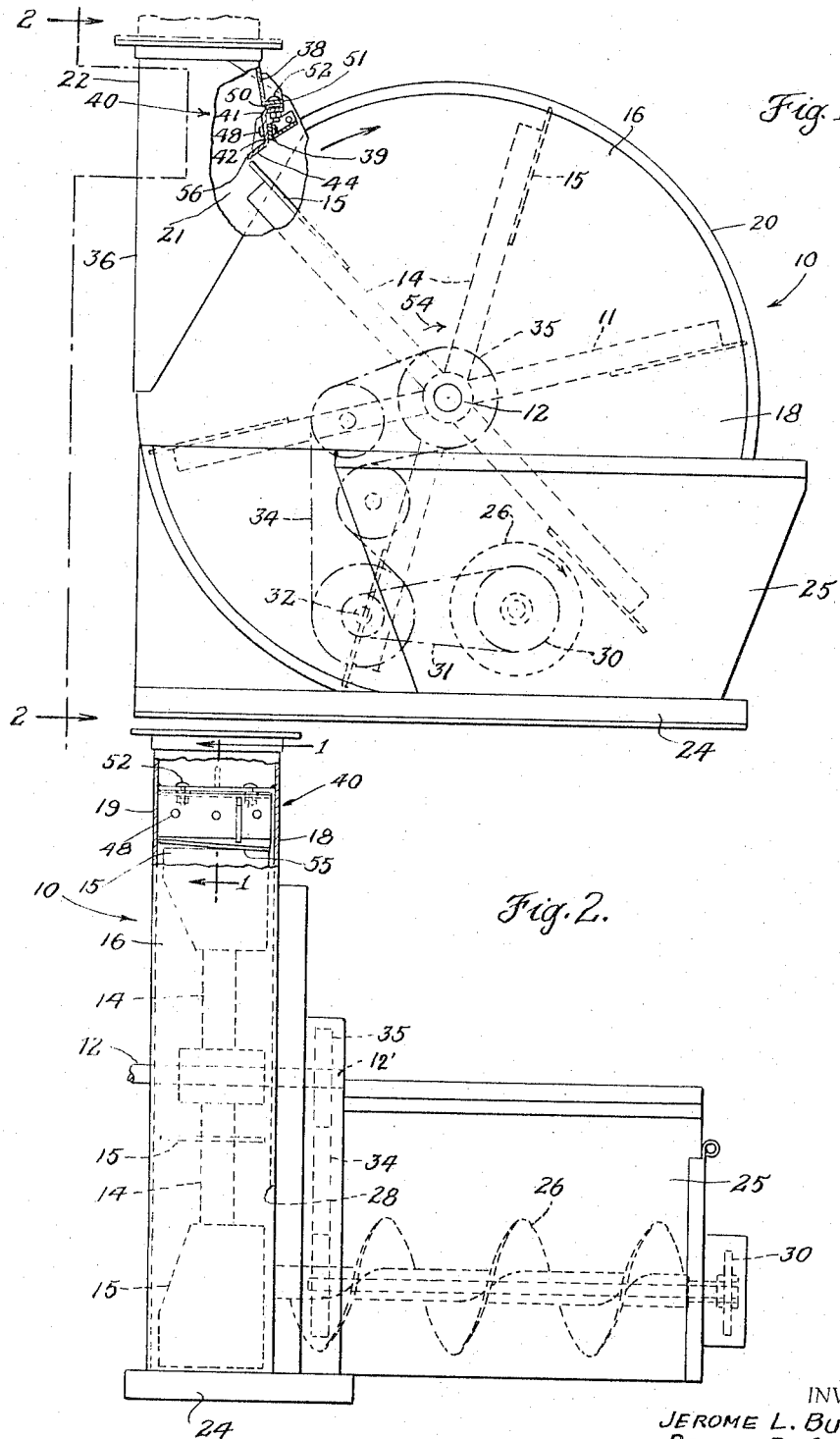
INVENTORS
JEROME L. BURINSKY &
BY BRUCE D. SCHWALM
Joseph A. Brown
ATTORNEY April 18, 1967  J. L. BURINSKY ET AL  3,314,596
FORAGE BLOWER
Filed Oct. 19, 1965  2 Sheets-Sheet 2
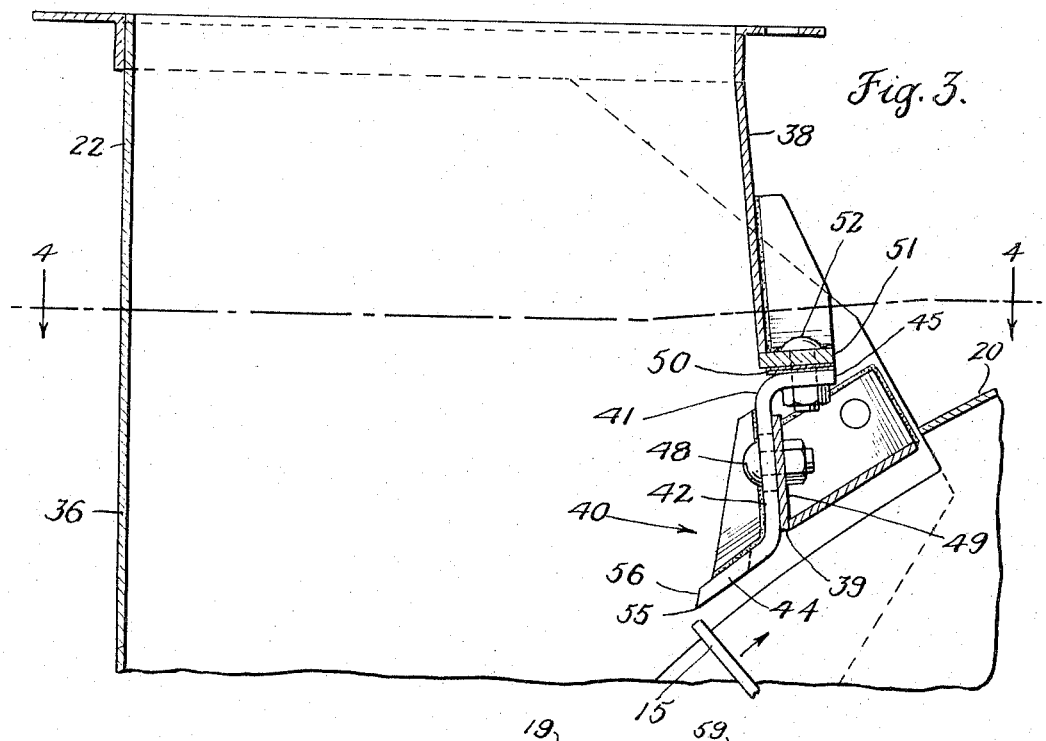
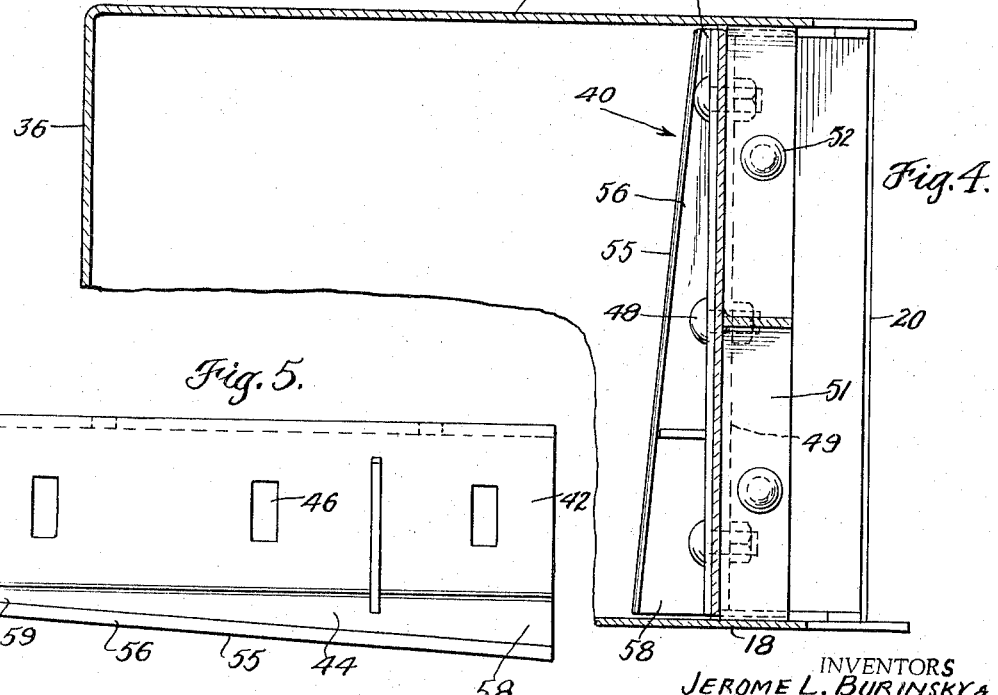
INVENTORS
JEROME L. BURINSKY &
BRUCE D. SCHWALM
BY
*Joseph A. Brown*
ATTORNEY United States Patent Office 3,314,596
Patented Apr. 18, 1967

3,314,596
FORAGE BLOWER
Jerome L. Burinsky, Birdsboro, and Bruce D. Schwalm, Leola, Pa., assignors to Sperry Rand Corporation, New Holland, Pa., a corporation of Delaware
Filed Oct. 19, 1965, Ser. No. 497,920
5 Claims. (Cl. 230—127)

ABSTRACT OF THE DISCLOSURE

An improved cut off knife for a forage blower mounted on the blower housing and extending across the corner formed by an arcuate wall of the housing and the discharge opening, the knife being V-shaped in cross section and preventing forage from catching on such corner.

---

This invention relates to forage blowers and more particularly to an improvement in such a blower to prevent material from becoming wedged in the structure.

In a conventional forage blower, a fan is supported for rotation on a horizontal axis. The fan is surrounded by a housing having a vertical front wall and a vertical rear wall interconnected by an arcuate side wall which is generally concentric to the fan axis. A vertically extending discharge spout is connected to the housing in an upper lateral location relative thereto and angularly spaced from a lower inlet opening in the front wall of the housing. Forage is adapted to be introduced into the unit by means of an auger or other suitable conveyor directed toward the front wall opening.

As the fan rotates, the blades thereon sweep across the inlet opening and then upwardly toward the discharge opening. Material is discharged through the tangential spout. As the fan blades pass the angle or corner formed by the spout and the arcuate housing, there is a tendency for some of the forage material to be wedged and wrapped on this corner. It is found in the blower art to provide some type of cut-off means in this location to prevent a wedging problem.

One object of this invention is to provide, in a forage blower of the character described, an improved cut-off knife to prevent wedging of material in the corner between the spout and the blower housing.

Another object of this invention is to provide a cut-off knife of the character described which is so constructed and situated that material is guided and directed away from the front wall of the blower housing and distributed along the axis of the fan for better discharge through the blower spout.

Another object of this invention is to provide a blower cut-off knife of the character described which is rugged and mounted by means wholly outside the blower housing.

A further object of this invention is to provide a blower cut-off knife which is adjustably mounted whereby it may be properly positioned relative to the blades of the blower fan.

A still further object of this invention is to provide a blower cut-off knife which is constructed and supported in such a manner that it may be easily properly positioned and adjusted.

Other objects of this invention will be apparent hereinafter from the specification and from the recital in the appended claims.

In the drawings:

FIG. 1 is a side elevation of a forage blower having a cut-off knife constructed according to this invention, part of the blower housing being broken away to show the knife structure;

FIG. 2 is an elevation taken on the line 2—2 of FIG. 2 looking in the direction of the arrows;

FIG. 3 is an enlarged medial vertical section in the area of the blower housing discharge spout and showing the details of the cut-off knife;

FIG. 4 is a fragmentary section taken on the line 4—4 of FIG. 3 looking in the direction of the arrows; and FIG. 5 is an end view of the cut-off knife.

Referring now to the drawings by numerals of reference, and particularly to FIGS. 1 and 2, 10 denotes a forage blower having a fan 11 supported on shaft 12 for rotation on a horizontal axis. The fan has radially extending arms 14, each of which carries a blade 15 at its outer end.

Surrounding fan 11 is a blower housing 16 having a front wall 18, a rear wall 19 and interconnected by an arcuate side wall 20. The arcuate wall 20 of the housing is generally concentric to the axis of fan 11. Wall 20 is provided with a discharge opening 21 which communicates with a vertically extending tangential spout 22. Opening 21 extends from about a nine to an eleven o'clock position.

Blower 10 is mounted on a frame structure 24 and a box or receptacle 25 extends horizontally outwardly from front wall 18. This box has an auger 26 in its bottom which has an axis parallel to the fan axis. Front wall 18 has an inlet opening 28. Forage dumped into the box 25 is conveyed by auger 26 into the bottom portion of the blower housing through the inlet 28.

Auger 26 is rotated by means of a sprocket 30. Sprocket 30 is driven by an endless chain 31 connected to a fore-and-aft extending shaft 32 (FIG. 1) along side box 25 and driven by an endless chain 34 connected to the sprocket 35 on a projecting end 12' (FIG. 2) of the shaft 12 of fan 11. Shaft 12 is driven from a suitable source of power, not shown, such as a power-takeoff connection to a tractor.

Spout 22 has a vertical wall 36 tangentially disposed relative to the blower housing and a side 38 which forms an acute angle or corner 39 with the arcuate wall 20 of the blower housing. To prevent material from being caught on corner 39 as the fan blades 15 pass it, a cut-off 40 is provided and shown in detail in FIGS. 3–5.

Cut-off 40 comprises a knife 41 which is Z-shaped in cross section and provided with a vertically extending middle portion 42, a bottom portion 44 and a top portion 45. The medial portion 42 of the knife has vertically extending rectangular slots 46 (FIG. 5) through which fastening bolts 48 project. These bolts are interconnected to a plate 49 rigid with the casing arcuate wall 20. The slots 46 are provided so that the knife 41 may be vertically adjusted relative to the blower housing. Its fixed position after adjustment is determined by spacer means 50 comprising shims interposed between portion 45 of the knife and a flange 51 on spout wall 38. After a suitable number of spacers have been provided, vertically extending bolts 52 clamp the parts.

The number of spacers employed is related to the lower section 44 of the knife. Such section extends substantially as a continuation of the arcuate wall 20 of the blower housing and it projects in a direction counter to the rotation of the fan 12 as indicated by the arrow 54 in FIG. 1. The cut-off knife is positioned to achieve optimum shearing results as the fan blades 15 pass.

An important feature of this invention is the extension of the lower section 44 of the knife. As shown best in FIG. 4, the lower section has a rectilinear cutting edge 55 which is beveled at 56 and which extends diagonally relative to the axis of rotation of the fan 11. Section 44 is wide at the end 58 adjacent blower housing front wall 18. It is relatively narrow at the end 59 adjacent the rear wall 19.

In the cut-off 20, the Z-shaped configuration of knife 41 gives it very substantial strength and rigidity. It will be noted from the drawings that all of the fastening members which carry the knife are outside the blower housing and thus do not impede the conveyance and throwing of material. The vertical position of the knife is simply set by using the shims 50 and the knife is held firmly in place by the connecting bolts 48. The diagonal extension of the cutting edge 55 of lower section 44 of the knife causes the crop material engaging the cutting edge to be directed away from the front wall 18 and toward the rear wall 19. This movement tends to distribute the forage material along the axis of the blower fan for better and more uniform distribution upwardly through spout 22. The rectilinear diagonal extension of the cutting edge produces a lateral movement of the material as it is brought into engagement with the cut-off. In addition to distribution advantages, the shearing of material is spread along the length of the cutting edge and all cutting does not take place at one point immediately adjacent front wall 18 where the material enters through inlet 28. The arrangement described is effective in achieving the desired objectives and this is accomplished with a design which is relatively simple and inexpensive to manufacture and adjust.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. In a forage blower, a fan supported for rotation on a horizontal axis, a housing in which said fan rotates, said housing having a front wall and a rear wall on opposite sides of the fan and interconnected by an arcuate wall having a portion at least generally concentric to said axis, a spout mounted on said housing and extending tangentially and vertically relative thereto, said arcuate wall having an upper lateral discharge opening communicating with said spout, means for rotating said fan in such direction that forage introduced into the bottom of said housing through said front wall is swept upwardly and discharged into said spout through said opening, said spout having a vertically extending side which forms an acute angle corner with said housing arcuate wall in a location at an upper end of said discharge opening, said fan having blades which successively pass said opening and close to said corner, a knife mounted on said housing and extending across said corner to prevent forage from catching thereon, said knife being Z-shaped and having a vertically extending middle section, a bottom section projecting in a direction opposite to the rotation of said fan, and a top section projecting in the direction of fan rotation, said knife bottom section having a cutting edge and said edge having a portion at least extending diagonal to said fan axis.

2. A forage blower as recited in claim 1 wherein said housing front wall has a bottom opening through which the forage is introduced, and said knife bottom section is wide at the end adjacent said front wall and narrow at the end adjacent the rear wall whereby, in addition to cutting forage directed toward said corner, said knife directs the forage away from said front wall and toward said rear wall.

3. A forage blower as recited in claim 1 wherein said knife bottom section constitutes a continuation of said housing arcuate wall, the knife being connected to the housing by fastening members projected through the knife middle section.

4. A forage blower as recited in claim 3 wherein spacer means is interposed between said housing and said knife top section whereby the vertical location of the knife cutting edge relative to said fan blades may be established, there being vertical slots in the knife middle section to permit vertical adjustment.

5. A forage blower as recited in claim 1 wherein said cutting edge is rectilinear from end to end and beveled.

References Cited by the Examiner

UNITED STATES PATENTS

| | | | |
|---|---|---|---|
| 2,265,758 | 12/1941 | Klosson | 103—111.1 |
| 2,381,220 | 8/1945 | Longenecker | 230—133 |
| 2,445,111 | 7/1948 | Gouinlock | 302—37 |
| 2,712,412 | 7/1955 | West | 302—37 |
| 2,733,100 | 1/1956 | Sparklin | 230—127 |
| 2,744,679 | 5/1956 | Howard | 230—133 |
| 2,956,505 | 10/1960 | Jekat et al. | 103—113 |
| 3,145,063 | 8/1964 | Kools | 302—37 |
| 3,191,539 | 6/1965 | Davenport | 103—113 |

DONLEY J. STOCKING, *Primary Examiner.*

H. F. RADUAZO, *Assistant Examiner.*